(12) United States Patent
Lee

(10) Patent No.: US 8,230,115 B2
(45) Date of Patent: Jul. 24, 2012

(54) CABLE REDUNDANCY WITH A NETWORKED SYSTEM

(75) Inventor: Kenneth S. Lee, Cambridge, MA (US)

(73) Assignee: Schneider Automation Inc., North Andover, MA (US)

( * ) Notice: Subject to any disclaimer, the term of this patent is extended or adjusted under 35 U.S.C. 154(b) by 447 days.

(21) Appl. No.: 11/966,196

(22) Filed: Dec. 28, 2007

(65) Prior Publication Data

US 2009/0172193 A1 Jul. 2, 2009

(51) Int. Cl.
*G06F 15/16* (2006.01)

(52) U.S. Cl. ........ 709/250; 709/239; 370/225; 370/226; 370/227; 370/228

(58) Field of Classification Search ................... 709/239, 709/250; 370/225–228
See application file for complete search history.

(56) References Cited

U.S. PATENT DOCUMENTS

| | | | |
|---|---|---|---|
| 6,016,523 A | 1/2000 | Zimmerman et al. | |
| 6,327,511 B1 | 12/2001 | Naismith et al. | |
| 6,640,314 B1 | 10/2003 | Lelaure et al. | |
| 6,895,024 B1* | 5/2005 | Drake et al. | 370/536 |
| 7,251,214 B2* | 7/2007 | Mark et al. | 370/219 |
| 2003/0016654 A1 | 1/2003 | Das et al. | |
| 2003/0179749 A1 | 9/2003 | Mark et al. | |
| 2005/0091394 A1 | 4/2005 | Breinlinger et al. | |
| 2006/0050631 A1 | 3/2006 | Koyuncuoglu et al. | |
| 2006/0193246 A1* | 8/2006 | Brute De Remur et al. | 370/216 |

FOREIGN PATENT DOCUMENTS

WO 2007149688 A2 12/2007

OTHER PUBLICATIONS

Ring Redundancy, online http://hus.hirschmann.com/English/industrial-ethernet-products/Downloadcenter/Technol..., Dec. 12, 2007, 1 pg.
The Cable Guy, Microsoft TechNet, Overview of IP Multicast, Feb. 2002, pp. 1-5, USA.
IEEE, Media Access Control (MAC) Bridges, Jun. 9, 2004, pp. 1-281, IEEE Computer Society, New York, USA.
International Search Report for PCT/US2008/088184, dated Feb. 25, 2009, pp. 1-4.

(Continued)

*Primary Examiner* — Duyen Doan
(74) *Attorney, Agent, or Firm* — Banner & Witcoff, Ltd.

(57) ABSTRACT

Aspects of the invention provide apparatuses, systems, and methods for supporting cable redundancy in a network connecting a network controller (101) and an I/O device (109) (an adapter). An adapter includes a first port (407) and a second port (409) for receiving the same messages from a scanner (301) over a first and second transmission media (353, 355), respectively. A connection manager module (423) instructs a switching module (419) to direct the output data contained in the first message to a data structure (421) when the first transmission medium is operational and to direct the output data contained in the second message to the data structure when the first transmission medium is non-operational. Also, the adapter formats a message from input data. The connection manager instructs a switch (411) to direct the message to a primary port (407) when a primary transmission medium (655) is operational and to direct the message to a secondary port (409) when the primary transmission medium (753) is non-operational.

27 Claims, 7 Drawing Sheets

OTHER PUBLICATIONS

Edmonds, Chris, "Programmable Controller Networking—Dual Cable, Redundancy, Multiple Networks and Applications," Advances in Instrumentation and Control, 1992, pp. 1411-1423, vol. 46, Part 2, Research Triangle Park, NC, US.

"Distrubuted I/O Advantys STB The Open Device Integration I/O System," 2003, pp. 1-8, Retrieved from the Internet: URL:http://www.schneider-electric.de/upload/FileManager/cat/pdf/aut/zxpadvantysstb_en.pdf.

Skendzic, Veselin et al., Enhancing Power System Automation Through the Use of Real-Time Ethernet, Power Systems Conference: Advanced Metering, Protection, Control, Communication, and Distributed Resources, 2004, pp. 480-495.

* cited by examiner

CABLE REDUNDANCY WITH A NETWORKED SYSTEM

BACKGROUND

Computer systems and network computing operations are increasingly relied upon by individuals, businesses and governments for critical services and business operations. In such systems, network uptime can be critical to the smooth operation of the underlying service or operation, and a network failure must be promptly isolated or restored. Thus, fault isolation and automatic recovery under network failure conditions are crucial requirements for higher bandwidth networks and task-critical networks. In addition, in a typical network failure and recovery scenario, delay on the order of even a few hundred milliseconds can be critical.

In manufacturing or other automation systems, architectures may be decentralized or distributed while delivering performance comparable to centralized systems. For instance, the Advantys STB distributed I/O system is an open, modular input/output system that makes it possible to design islands of automation managed by a master controller via a bus or communication network. The Advantys STB distributed I/O system is a product of Schneider Automation Inc., One High Street, North Andover, Mass. Another problem that can be encountered during a network failure scenario is the inability to access the physical links or devices at the location of the failure.

Often, the island and associated I/O modules may be widely dispersed and may be in isolated locations, or the target systems may be enclosed in other machinery. In these types of network operations, getting physical access to a remote I/O module or network link during a failure situation can be difficult. Furthermore, in networks such as industrial automation systems, reliability is critical. In a factory, for instance, if a network connection goes down, operators could be physically harmed. In these types of network operations, fault recovery must be automatic.

With the increased complexity of industrial automation applications, computer networks in an industrial setting often include numerous devices that are connected over a network such as an EtherNet/IP network. In order to ensure that the devices are able to communicate with each other in a reliable fashion, redundant cabling is often used to provide transmission media. If a transmission medium becomes non-operational (e.g., when a cable is inadvertently removed), a controller may typically require a substantial amount of time to detect the non-operational transmission medium in a real-time control network. Once detected, the controller can reconfigure the transmission path to utilize the redundant cabling. However, during reconfiguration of the transmission path, messages may be lost between devices on the network.

In a typical fault recovery scenario, when a failure occurs, data traffic is rerouted or switched from a current faulty path to a backup path. Depending on the actual redundancy strategy, the standby or backup data path may be dedicated, may require a physical change in connections, or may be a virtual backup path to the active or primary path. Current software methods for providing redundancy in a network require that the devices on the network analyze or discover the entire network to determine a backup path. Rapid Spanning Tree Protocol (RSTP) and Hirschmann HIPER-Ring are two such methods. In both RSTP and Hirschmann HIPER-Ring, the entire network must be discovered before rerouting can be implemented, adding both time and the use of computing resources to fault recovery. In addition, in both RSTP and Hirschmann HIPER-Ring, the network devices implementing the fault recovery must communicate with other network devices on the network.

Thus, there is a real market need to provide a reliable and expeditious approach for providing redundant transmission media in a real-time control network without appreciably disrupting operation.

SUMMARY

An aspect of the invention provides apparatuses, computer-readable media, and methods for supporting cable redundancy in a network connecting a network controller and an I/O device. The network typically includes a switch and supports a plurality of adapters, in which two or more transmission media are configured between a scanner and each of the adapters. Additionally, switches and routers may be situated between the scanner and the adapter.

With another aspect of the invention, an adapter includes a first port and a second port for receiving first and second messages from a scanner over a first and second transmission media, respectively, where both messages contain the same output data. A connection module instructs a switching module to direct the output data contained in the first message to a data structure when the first transmission medium is operational. When the first transmission medium is non-operational and the second transmission medium is operational, the connection manager instructs the switching module to direct the output data contained in the second message to the data structure.

With another aspect of the invention, an adapter formats a message from input data. A connection manager instructs a switch to direct the message to a primary port when a primary transmission medium is operational and instructs the switch to direct the message to a secondary port when the primary transmission medium is non-operational and the secondary transmission medium is operational.

With another aspect of the invention, an adapter subscribes to a multicast address so that a message received at a second port is the same as a message received at a first port during normal operation. Consequently, output data arrives to the adapter via multicast addressing.

With another aspect of the invention, an adapter dynamically changes an assigned address of the second port to an address of a first port when a first transmission medium is non-operational and a second transmission medium is operational. Consequently, the communicating partner does not detect the communication error that may necessitate the communication partner to operate differently from normal operation.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein.

DETAILED DESCRIPTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

The following clarify terms pertaining to the discussion herein.

Scanner: A type of network device that can respond to connection requests and that can initiate connections. With a master-slave relationship, a scanner is categorized as a master device. With an EtherNet/IP network, a scanner is associated with a scanner class device during a connection establishment phase and typically connects directly to a controller.

Adapter: A type of network device that communicates with a scanner but does not initiate connections. With a master-slave relationship, an adapter is categorized as a slave device during a connection establishment phase. Examples of an adapter include an I/O device and a variable speed device. With an EtherNet/IP network, an adapter is associated with an adapter class device.

Figure 1:
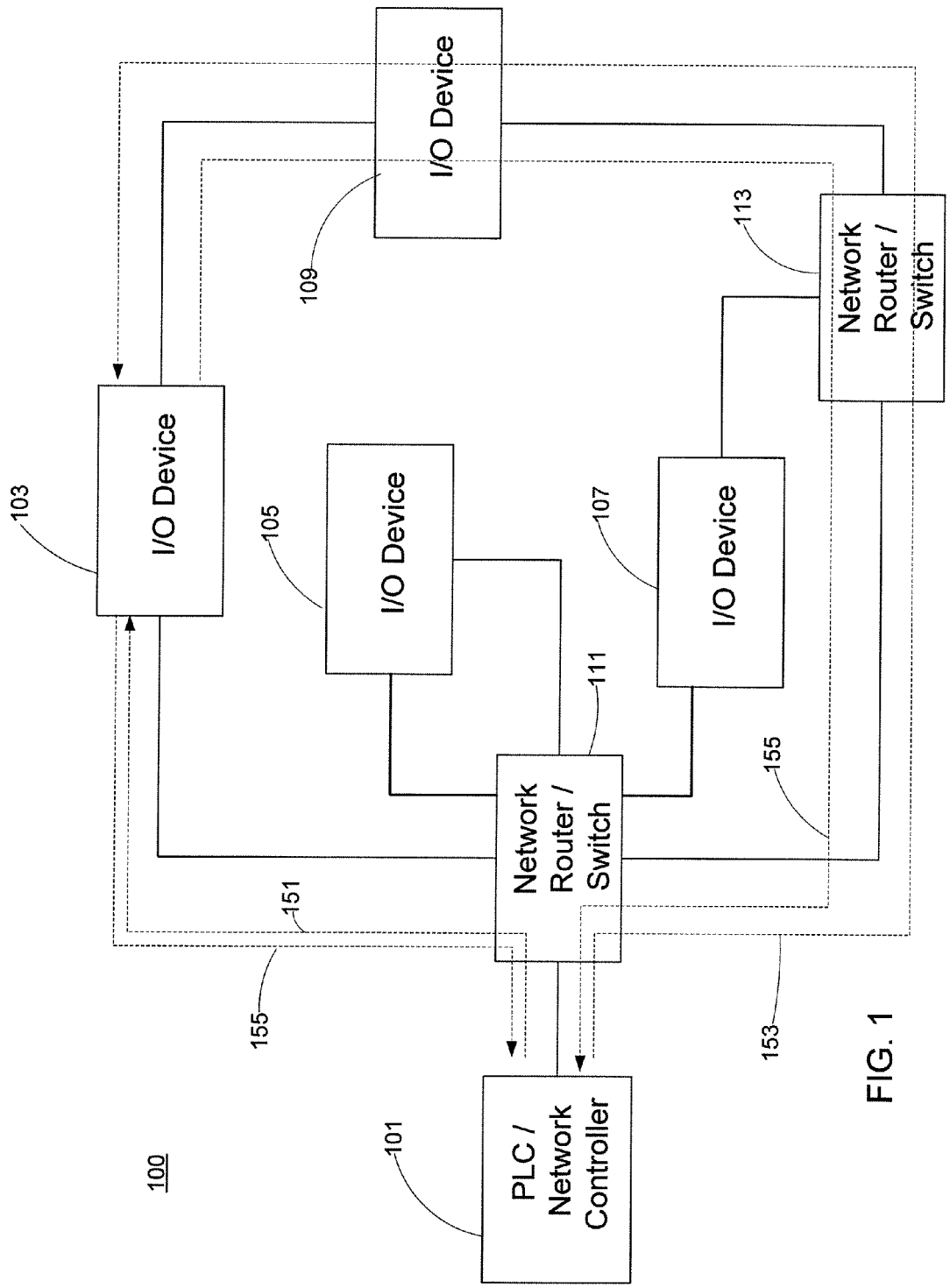
FIG. 1 shows a system with a network controller interacting with I/O devices according to an embodiment of the invention.

FIG. 1 shows system 100 with a network controller 101 interacting with I/O devices 103-109 according to an embodiment of the invention. As an example, a network controller, or in this embodiment programmable logic controller (PLC) 101, communicates with I/O device (adapter) 103 by sending duplicate messages over paths 151 and 153 in the forward direction. (Actually, network controller 101 sends only one multicast message to switch 111. Consequently, switch 111 sends multicast messages to I/O device 103 over paths 151 and 153.) A path may traverse network routers and switches (e.g., network router/switch 111 and 113) and/or other I/O devices (e.g., I/O device 109) with a daisy chain configuration. (In the example shown in FIG. 1, two paths may be configured from network controller 101 to each I/O device 103-109.) As will be discussed in greater detail, if either path 151 or path 153 fails (e.g., when a cable is mistakenly removed), transmission from network controller 101 to I/O device 103 can continue without establishing a new path after determining that path 151 has failed.

In the reverse direction (i.e., from I/O device 103 to network controller 101), I/O device 103 can transmit a message over path 155. (While failure mechanisms in the forward and reverse directions may be symmetric, embodiments of the inventions may support asymmetric failure modes.) When the failure mechanism is symmetric, if path 151 fails in the forward direction, then I/O device 103 can communicate to network controller 101 over path 155 in the reverse direction.

Figure 2:
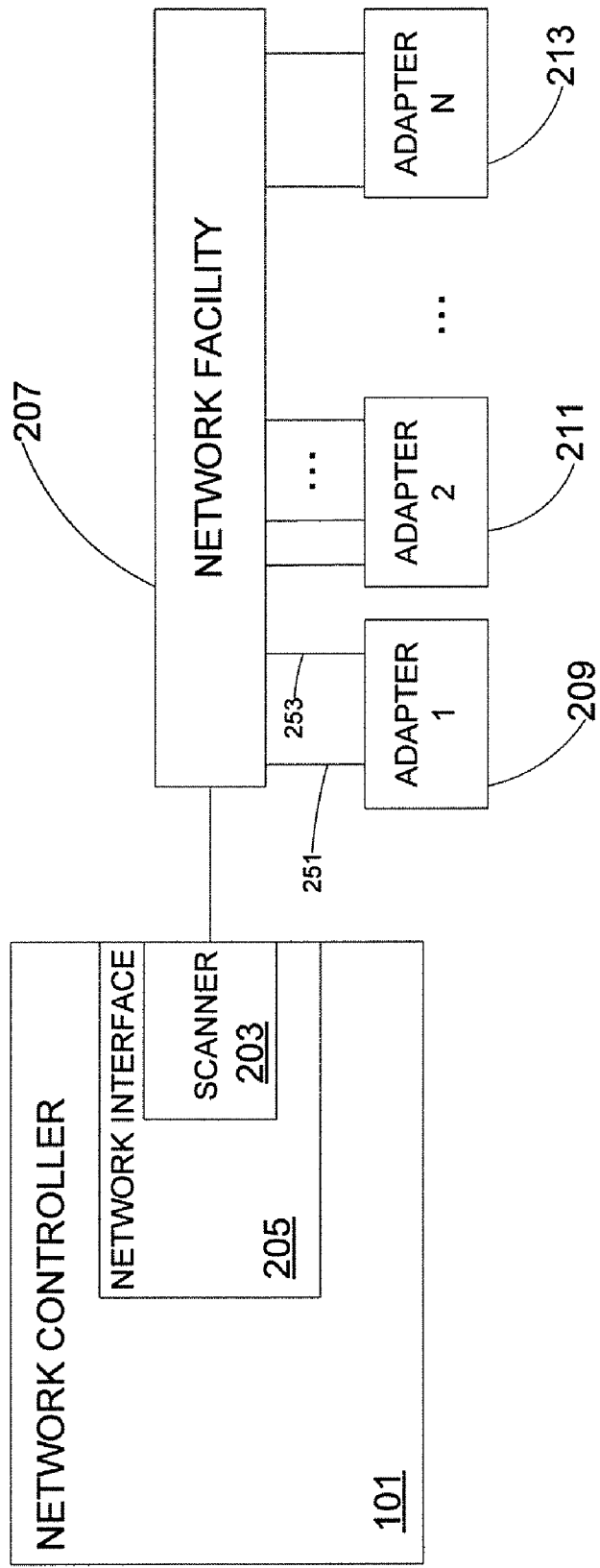
FIG. 2 shows a network controller connected to adapters over a network facility according to an embodiment of the invention.

FIG. 2 shows network controller 101 connected to adapters 209-213 over network facility 207 (e.g., the network of system 100 as shown in FIG. 1) according to an embodiment of the invention. With embodiments of the invention, network facility 207 may assume different types of networks, including an Ethernet network, using a standard communications protocol, User Datagram Protocol (UDP). Network controller 101 includes scanner 203, which resides within network interface 205. Network interface 205 may be a communications card that fits into a backplane of network controller 101. Even though EtherNet/IP network is used as the main example, any communication protocol that replies upon multicast or broadcast of data messages may be supported.

Device scanner 203 communicates with adapters 209-213, both locally (located on the backplane of network controller 101) or remotely (over network facility 207). A device scan table may be provided for storing data relating to the adapters 209-213. (The device scan table may include parameters which can be used by scanner 203 to communicate with adapters 209-213.) A standard communications interface, e.g., a UDP/IP stack with an Ethernet driver, may be provided for interfacing between the device scanner 203 and network facility 207 using a standard communication protocol, e.g., UDP. With an Ethernet implementation, network facility 207 typically provides a fast, flexible, and convenient way of interconnecting I/O devices 209-213 and may support interconnection with a plurality of network controllers (not shown).

Network controller 101 typically comprises a microprocessor and memory (e.g., random access memory (RAM)), with software or firmware running therein. Network controller 101 may store a configuration table containing parameters associated with the scan table. The parameters within the configuration table may be read into the scan table upon start-up of network interface 205 and/or device scanner 203. However, embodiments of the present invention may have the parameters read into the scan table by other means, e.g., through a web page (accessible through the world wide web (WWW)) located on network interface 205. Alternatively, the parameters may be placed into the scan table through a user creating/editing a file on the user's personal computer. The user may send the file to network interface 205 using a File Transfer Protocol (FTP) or some other transfer means from a remote location. With embodiments of the invention, network interface 205 also has a real time operating system for running the various tasks on the network interface 205, including an IO scan task.

Figure 3:
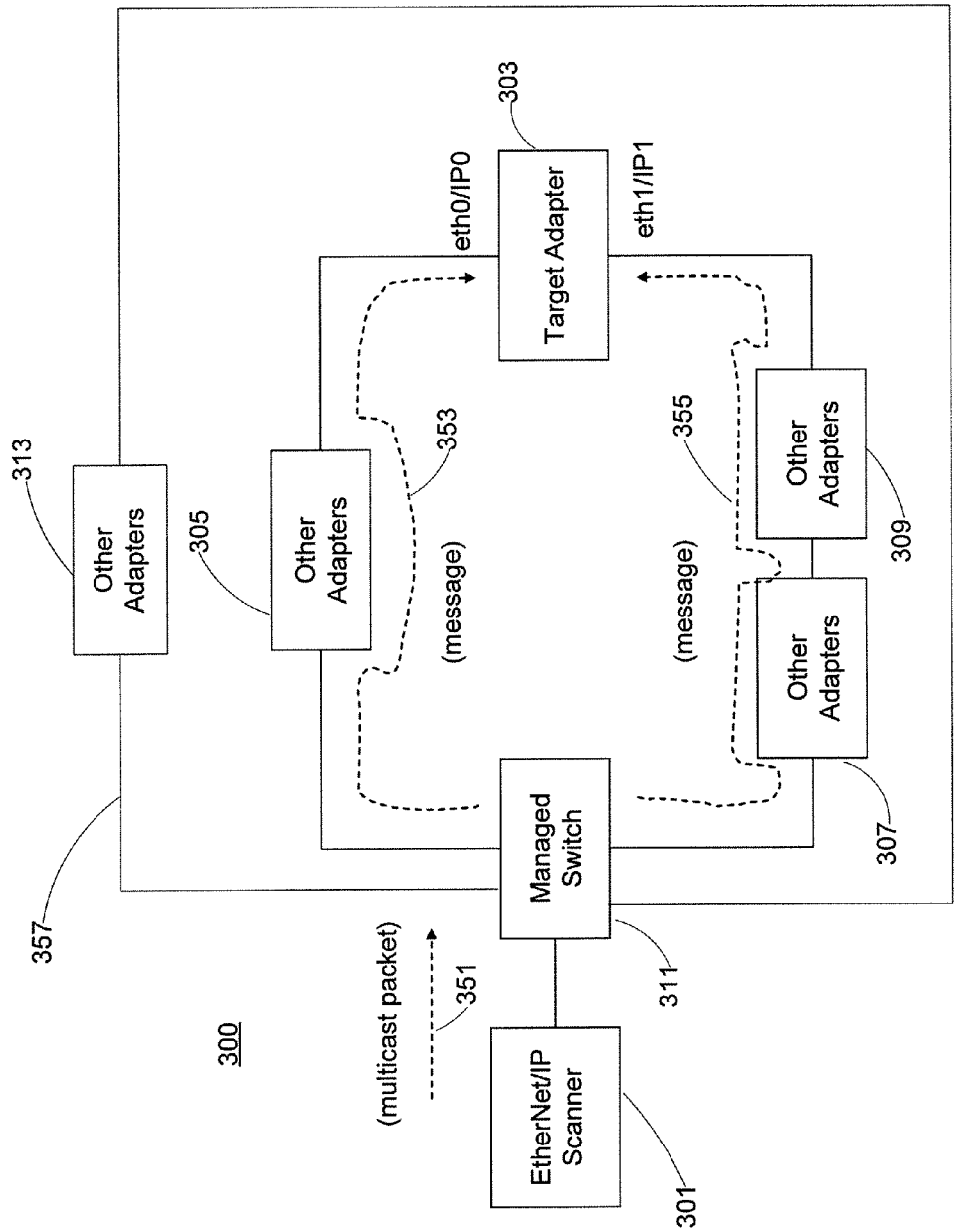
FIG. 3 shows a scanner communicating with a target adapter over two transmission media according to an embodiment of the invention.

FIG. 3 shows scanner 301 communicating with target adapter 303 over two transmission media 353 and 355 according to an embodiment of the invention. The exemplary embodiment utilizes EtherNet/IP™ (Ethernet Industrial Protocol), although embodiments of the invention can support other protocols. EtherNet/IP is an open industrial application layer protocol for industrial automation applications. It is supported by Open DeviceNet Vendors Association (ODVA). Built on the standard TCP/UDP/IP protocols, EtherNet/IP utilizes Ethernet hardware and software to define an application layer protocol for configuring, accessing, and controlling industrial automation devices.

As shown in FIG. 3, network 300 and the devices within network 300 support cable redundancy. Network 300 supports cable redundancy, including a daisy-chain loop in EtherNet/IP networks and devices. Also, a daisy-chain loop architecture with a Modbus/TCP or Modbus/UDP network may be supported by embodiments of the invention. Modbus is a serial communications protocol for use with programmable logic controllers. Modbus allows for communication between many devices connected to the same network, for example, a system that measures temperature and humidity and communicates the results to a computer. Modbus is typically used to connect a supervisory computer with a remote terminal unit in supervisory control and data acquisition The Modbus protocol supports both serial ports and Ethernet ports.

With embodiments of the invention, changes are implemented only in the individual slave devices (e.g., adapters 303-309) without changes in the master devices (e.g., scanner 301) that are already deployed with prior art technology. A common mode of failure in a distributed control network is a network cable disconnect. Cable redundancy refers to the network architecture, in which there are multiple routes from the controller device, e.g. a programmable logic controller (and its network scanner) to the slave device, e.g., an adapter, whereby the slave device has two or more physical cable connections to the network (and ultimately the controller device). Such an architecture is designed to allow one or more cables to be accidentally or intentionally disconnected while maintaining undisrupted communication between the devices.

An EtherNet/IP device (e.g., target adapter 303) configures two or more physical Ethernet ports in order to utilize the redundant cable architecture of network 300. For example, target adapter may comprise an adapter-class device, e.g., Advantys™ EtherNet/IP network interface modules with two Ethernet ports, eth0 and eth1 having its own IP address, IP0 and IP1, respectively. However, embodiments of the invention can support more than two Ethernet ports (each port associated with a transmission medium) in order to obtain greater robustness against cable loss as well as failures in intermediate switches and other network devices.

The two Ethernet ports inside target adapter 303 may be connected via managed switch 311. Since multicast packets are broadcast on Ethernet over communications media 353 and 355, managed switch 311 transmits a packet (multicast message) received via one port to the other port when managed switch 311 receives multicast packet 351 from scanner 301. For greater flexibility and performance, managed switch 311 may utilize Internet Group Management Protocol (IGMP) snooping.

The two Ethernet ports inside target adapter 303 may be connected via managed switch 311. If the switch 311 supports IGMP snooping, then when it receives a multicast packet 351 from scanner 301 destined for adapter 303, it will forward the packet via paths 353 and 355, but not via path 357.

Without IGMP snooping, a switch (at layer 2) may resort to flooding multicast packets to all ports (corresponding to other adapters 305-309 and 313, as shown in FIG. 3 or I/O devices 105-109 as shown in FIG. 1) within network 300. However, with embodiments of the invention, managed switch 311 intercepts (snoops) IGMP join and leave messages received on the interface from hosts. Traffic is forwarded only to those ports (e.g., eth0/IP0 and eth1/IP1 associated with target adapter 303) that have joined the multicast group, and not to 313. Traffic continues to be forwarded until the port (client) issues a leave message, at which time managed switch 311 stops forwarding traffic to the port. When all ports (nodes) have left the multicast group, managed switch 311 prunes off the traffic.

Alternatively, VLAN's could be set up to minimize the unneeded (broadcast) packets in the loop. In a virtual LAN (VLAN), a group of network devices may be connected to different physical segments, but behaves as if they are on the same physical LAN. Such grouping allows switches to form different broadcast domains, thereby reducing the amount of broadcast packets.

Figure 4:
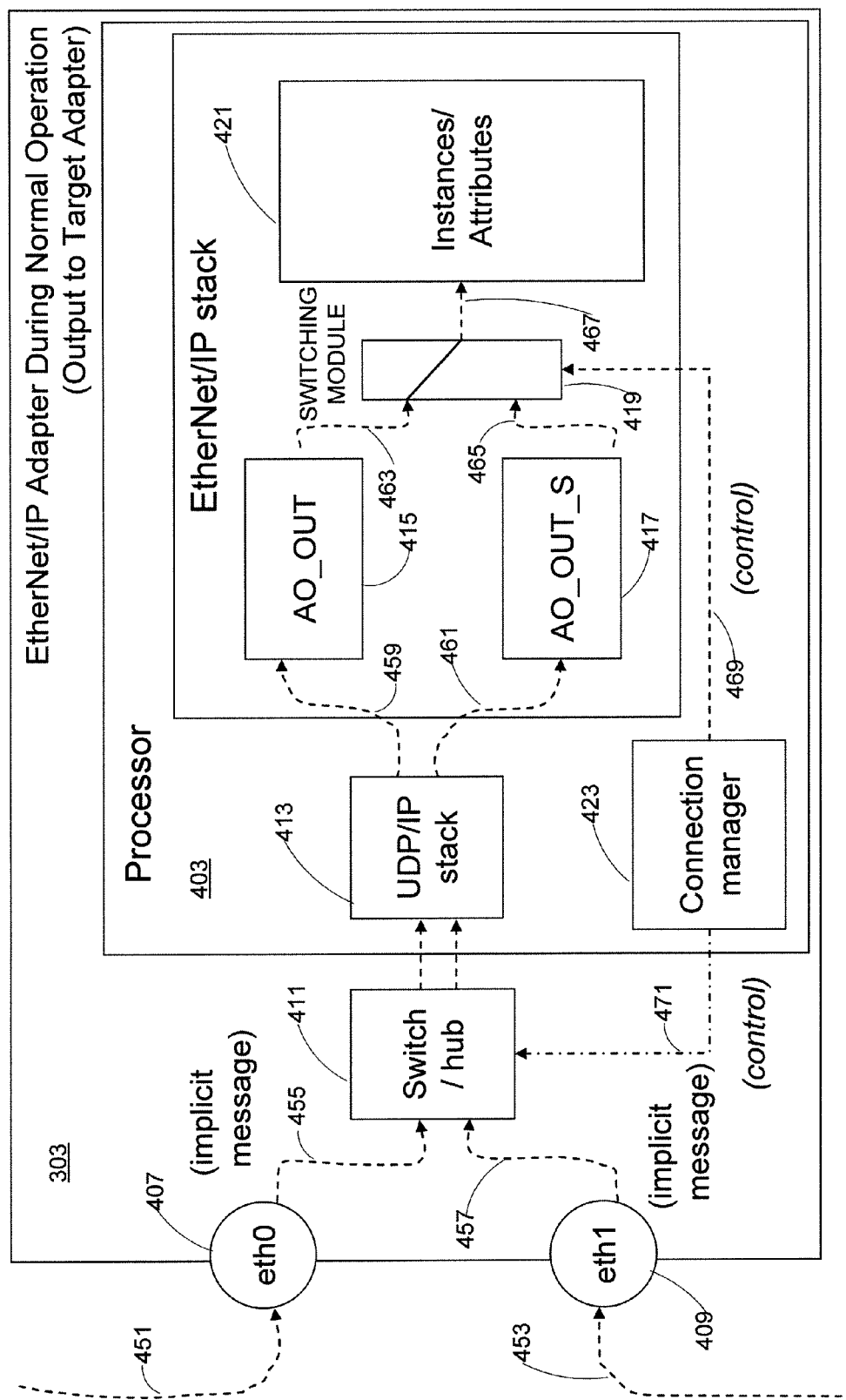
FIG. 4 shows an adapter during normal operation when receiving messages from a scanner according to an embodiment of the invention.
Figure 6:
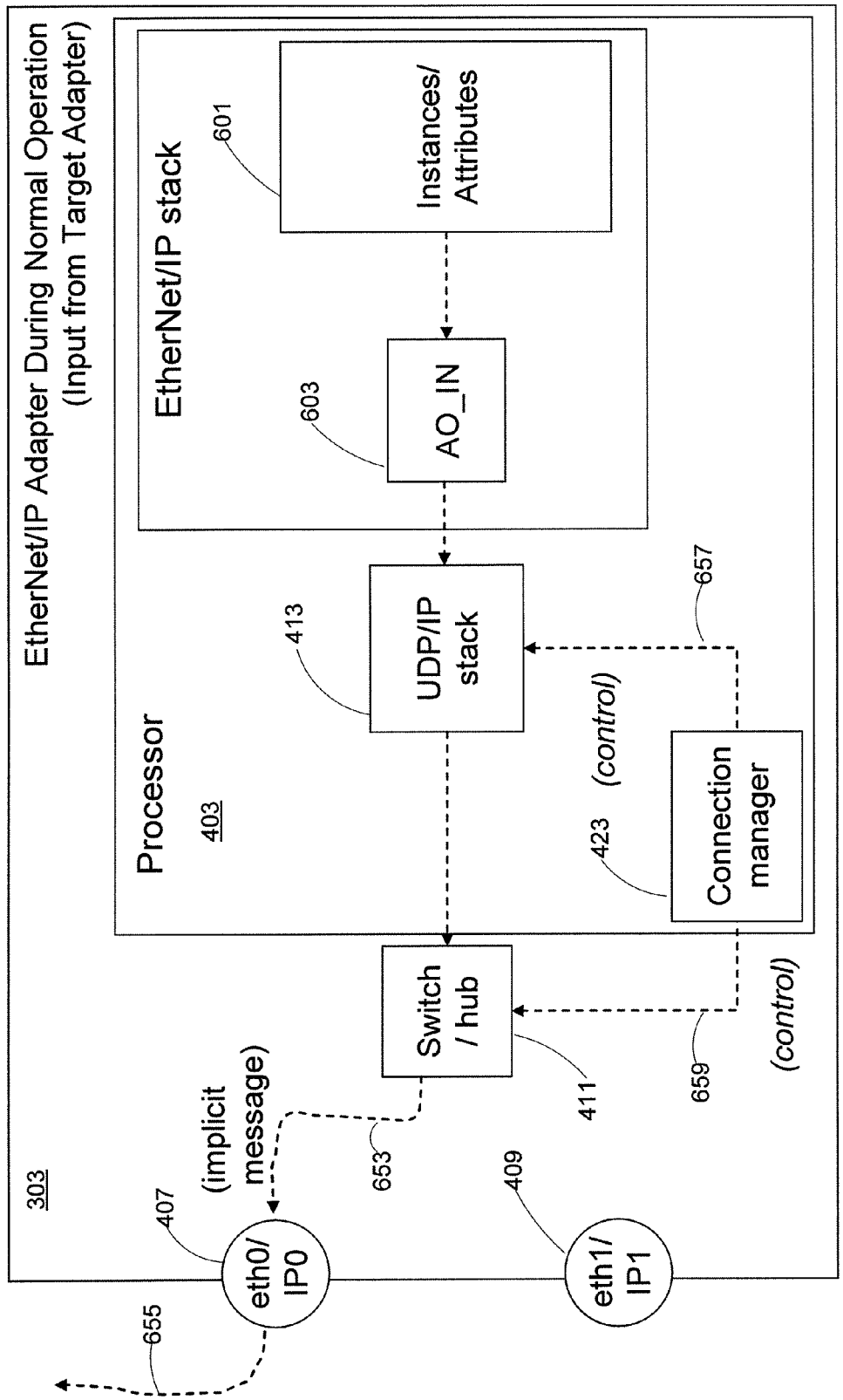
FIG. 6 shows an adapter during normal operation when transmitting messages to a scanner according to an embodiment of the invention.

FIG. 4 shows adapter 303 during normal operation when receiving messages from scanner 301 according to an embodiment of the invention. Assembly objects (corresponding to data attributes that are stored in buffers) are used in an EtherNet/IP network to communicate input and output data that are transferred between the producer and the consumer. (An assembly object may comprise basic information such as name and identification, file collection, and security specifications. A device may have multiple output assembly objects that correspond, for example, to discrete output and analog outputs.) As shown in FIG. 3, buffer (AO_OUT) 415 stores an assembly object for output data. As shown in FIG. 6, buffer (AO_IN) 601 stores an assembly object for input data. However, embodiments of the invention may not utilize separate objects for input and output data.

In order to provide redundancy, shadow buffer (AO_OUT_S) 417 stores a shadow assembly object that binds to the same data attributes for the regularly received assembly object (as stored in buffer 415) that binds to output data. AO_OUT 415 is populated with data received via port 407, while AO_OUT_S is populated with data received via port 409.

During network/device configuration, EtherNet/IP scanner 301 sees adapter 303 at a particular IP address, IP0. Scanner 301 then establishes a class 1 connection (implicit messages) with adapter 303. For both forward and reverse directions (scanner to adapter and adapter to scanner), network 300 may use the multicast option. When a class 1 connection is established between scanner 301 and adapter 303 (where port eth0/IP0 407 of adapter 303 subscribes to the multicast address agreed upon during the connection establishment phase), adapter 303 internally triggers second Ethernet port (eth1/IP1) 409 also to subscribe to the same multicast address subscribed by port (eth0/IP0) 407. As described above, managed switch 311 may provide the routing of multicast messages.

After completing the configuration described above, whenever scanner 301 multicasts an implicit message to the adapter, the packet is delivered to both IP0 port 407 (over transmission medium 451) and IP1 port 409 (over transmission medium 453) by interfacing via the redundant routes/cables. If both transmission media 451 and 453 (coming into eth0 port 407 and eth1 port 409) are up and active, the implicit message arriving via eth0/IP0 port 407 is used to update AO_OUT buffer 415 (over path 455, switch 411, stack 413, and path 459). (Proper operation of a transmission medium requires the integrity of the associated cables as well as network devices along the routes.) The same implicit message arriving via eth1/IP1 port 409 is used to update AO_OUT_S buffer 417 (over path 457, switch 411, stack 413, and path 461). Data in AO_OUT buffer 415 is used to update mapped attributes data structure 421 in the class, while data in AO_OUT_S buffer 417 is dormant.

In the example shown in FIG. 4, one assumes that eth0/IP0 port 407 is the main/default (primary) port that updates attributes data structure 421 through switching module 419 over paths 463 and 467. Since it is not known a priori which port will be better, adapter 303 chooses one port as the primary. The primary port (port 407 as shown in FIG. 4) remains the primary port unless/until adapter detects a disruption in network connection, e.g., cable disconnect. As will be discussed in FIG. 5, if there is a cable disconnect or other network failure in the primary port 407 (eth0), AO_OUT_S buffer 417 rather than AO_OUT buffer 415 is used to update the attributes data structure 421 mapped in the object.

Connection manager 423 monitors the integrity of transmission media 451 and 453 and configures switch 411 and switching module 419 through control signals 471 and 469, respectively, so that attributes data structure 421 is updated from AO_OUT buffer 415 when transmission medium 451 is operational. When determining if a transmission route is operational, connection manager 423 may consider the loss of messages (e.g., when a cable is disconnected) as well as message delays (which may result from delays in network switches and intermediate adapters). For example, if a multicast packet arrives as port 409 (eth1) substantially earlier than at port 407 (eth0), then connection manager 423 may select port 409 as the primary port. As will be discussed with FIG. 5, connection manager 423 configures switching module 419 and switch 411 with control signals 553 and 555, respectively, so that attributes data structure 421 is updated from AO_OUT_S buffer 417 through paths 465 and 551.

With the embodiment shown in FIG. 4, processor 403 supports the functionalities of UDP/IP stack 413, connection manager 423, buffers 415 and 417, switching module 419, and attributes data structure 421. Processor 403 utilizes memory (not explicitly shown) that stores computer-executable instructions for processor 403 to execute in order to support the above functionalities.

Figure 5:
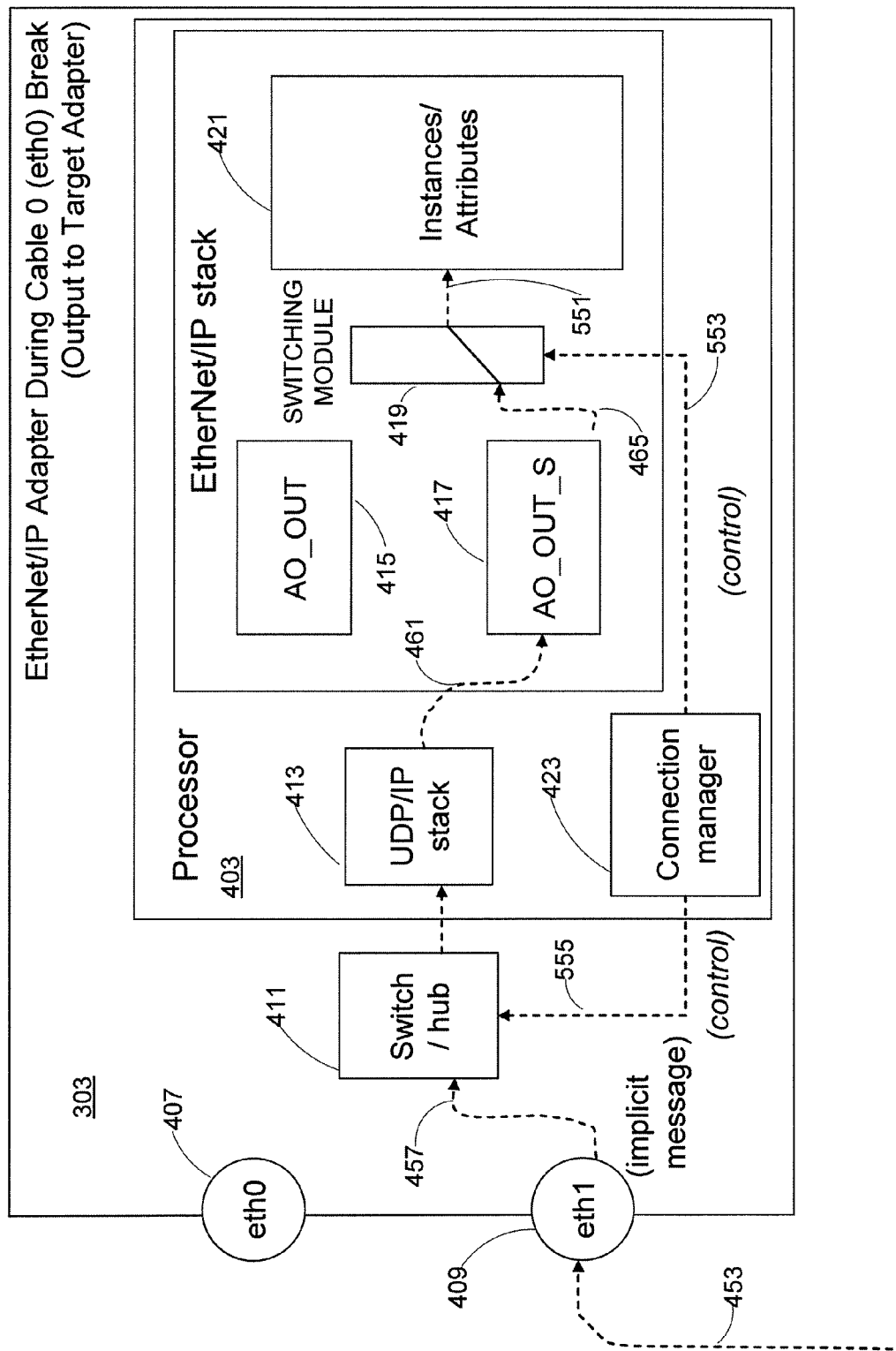
FIG. 5 shows an adapter during abnormal operation (in which a transmission medium fails) when receiving messages from a scanner according to an embodiment of the invention.

FIG. 5 shows adapter 303 during abnormal operation when receiving messages from scanner 301 according to an embodiment of the invention. If there is a cable disconnect in the primary port 407 (eth0), AO_OUT buffer 415 no longer is used to update attributes data structure 421 as mapped in the assembly object. Instead, adapter 303 uses AO_OUT_S buffer 417. As eth1 port 409 continues to receive the implicit messages from scanner 301, no messages will have been lost because the connection to port 409 was established before failure of transmission medium 451. As previously discussed, if greater robustness in desired, additional ports with additional transmission media may be supported.

Note that any multicast packets received via one Ethernet port may be sent out the other Ethernet port, depending on the capability and configuration of adapter 303. Consequently, embodiments of the invention may support a daisy chain configuration in which a message passes through an adapter (e.g., adapter 305 as shown in FIG. 3) to target adapter 303. In such a case, if an adapter receives a multicast packet that is not directed to the adapter, the adapter sends (relays) the packet out via the other port.

In order to determine if a transmission medium is operational, embodiments of the invention may utilize a physical level detection scheme in which a loss of a physical signal is detected. To determine if there is a problem in a route (e.g., one of the switches in the route between scanner 301 and adapter 303 is down), the detection scheme may use some sort of timeout. With EtherNet/IP, the detection scheme may rely on the output data message itself, as the scanner 301 may periodically transmit new multicast packets to adapter 303. If no new packet is received at port 407 (eth0) (beyond when it was expected) but port 409 (eth1) has received a new packet, then connection manager 423 may decide that port 407 is down and port 409 is up. As another example, adapter 303 monitors transmission medium 451 for a heartbeat signal from scanner 301 to determine if transmission medium 451 is operational. The heartbeat signal may comprise a periodically transmitted message from scanner 301. If adapter 303 does not receive a heartbeat signal within a predetermined time interval, adapter 303 deems that transmission medium 451 is non-operational. That being the case, if a heartbeat signal is detected at port 409, then adapter 303 uses AO_OUT_S buffer 417 to update attributes data structure 421.

FIG. 6 shows adapter 303 during normal operation when transmitting messages to scanner 301 according to an embodiment of the invention. The operation from adapter 303 to scanner 301 varies from the operation from scanner 301 to adapter 303 as previously discussed. Processor 403 stores an assembly object from attributes data structure 601 and then inserts the assembly object in AO_IN buffer 603. Processor 403 then formats a transmitted message from data attributes in attributes data structure 601. During normal operation, as controlled by connection manager through control signals 657 and 659, primary port 407 is used to transmit the formatted message to scanner 301 through switch 411, path 653, and primary transmission medium 655.

Figure 7:
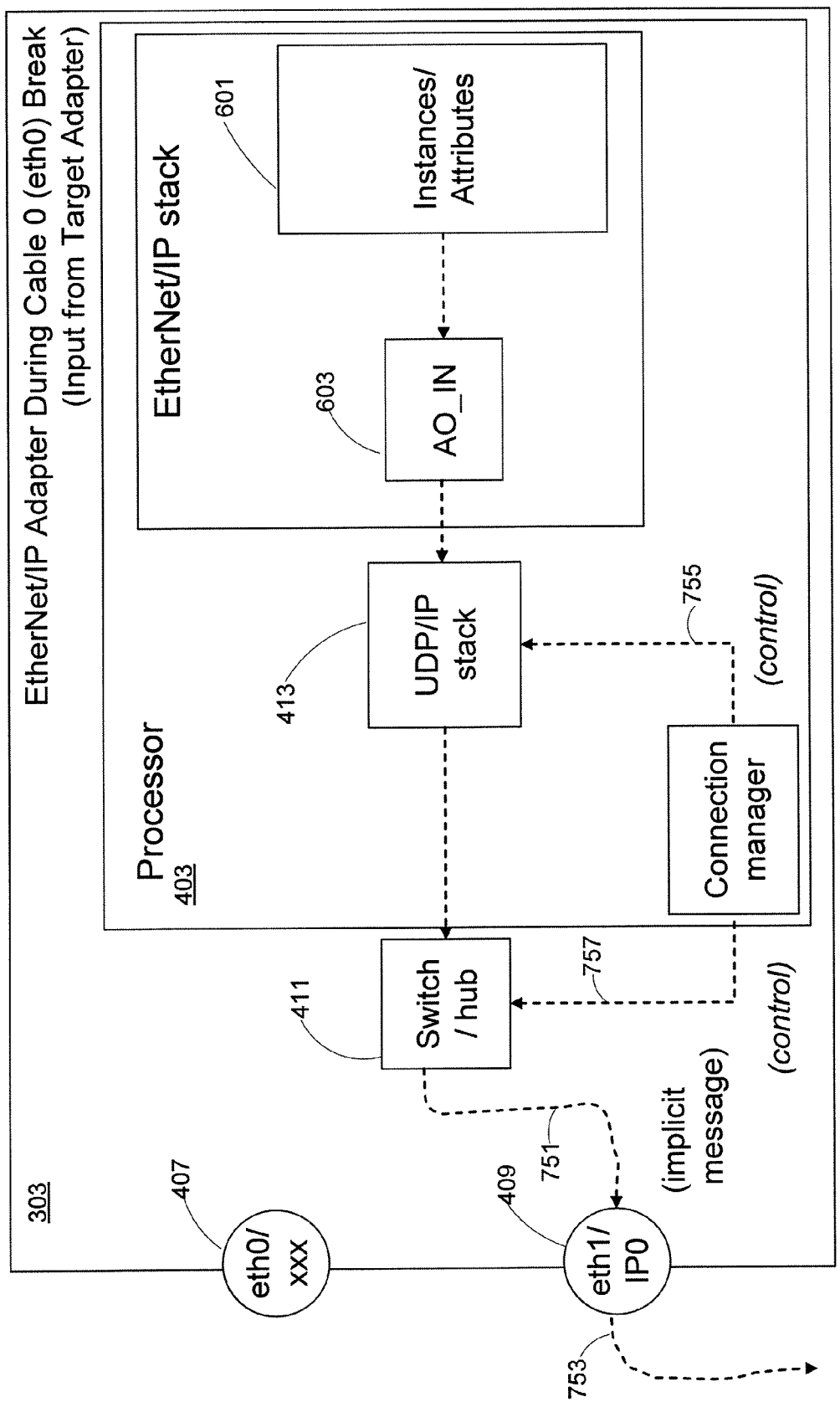
FIG. 7 shows an adapter during abnormal operation when transmitting messages to a scanner according to an embodiment of the invention.

FIG. 7 shows adapter 303 during abnormal operation when transmitting messages to scanner 301 according to an embodiment of the invention. If adapter 303 detects a cable break in transmission medium 655 (corresponding to primary port 407), adapter 303 dynamically changes the IP address bound to eth1 port 409 to that used by eth0 port 407. Adapter 303 sends the message over secondary transmission medium 753 through path 751 and secondary port 409, as controlled by connection manager 423 through control signals 755 and 757. Adapter 303 continues to sends messages as before the transmission disruption. However, the operation of scanner 301 is transparent to the reconfiguration at adapter 303.

For support both transmission to and from adapter 303, transfer to the redundant cable connection can be seamless, i.e., no packets are dropped. Also, features of adapter 303 are consistent with EtherNet/IP technology and specifications, preserving investment in scanner 301 and the network infrastructure (including transmission media and switches).

With embodiments of the invention, symmetry of transmission integrity may be assumed with a standard-based network. In other words, if a transmission failure is detected from scanner 301 to adapter 303, adapter 303 deems that transmission from adapter 303 to scanner 301 has also failed for the same transmission medium. If that is the case, adapter 303 utilizes the other port to send messages to scanner 301. However, other embodiments of the invention may not assume symmetric transmission integrity, where different transmission media are used for the forward and reverse directions between scanner 301 and adapter 303 and where it is possible to independently detect the physical link state of each transmission medium. For example, the receive link of port 407 (eth0) may be good, while the transmit link of port 407 may be bad.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. An adapter comprising:
   a first port having a first Internet Protocol (IP) address and configured to receive a first received message over a first transmission route, wherein the first received message contains output data and wherein the first transmission route is external to the adapter;
a second port having a second IP address and configured to receive a second received message over a second transmission route, wherein the first and second received messages are part of a same multicast group, and wherein the second transmission route is external to the adapter and is different from the first transmission route;
a switching module coupled to the first port and the second port;
a memory containing a data structure; and
a connection manager configured to:
  determine whether the first transmission route and the second transmission route are operational;
  instruct the switching module to direct the output data contained in the first received message to the data structure when the first transmission route is operational; and
  instruct the switching module to direct the output data contained in the second received message to the data structure when the first transmission route is non-operational and when the second transmission route is operational,
wherein the adapter is configured to swap the first and second IP addresses of the first and second ports when the adapter detects that the first transmission route is non-operational, and
wherein the connection manager is configured to determine whether the first transmission route and the second transmission route are operational based on a comparison of a message delay of the first and second transmission routes.

2. The adapter of claim 1, wherein the adapter comprises an I/O device.

3. The adapter of claim 1, wherein the first and second messages are in accordance with an EtherNet/IP protocol.

4. The adapter of claim 1, further comprising:
a switch;
a formatting module configured to format a transmitted message from input data;
wherein the connection manager is further configured to:
  instruct the switch to direct the transmitted message to the first port when the first transmission route is operational; and
  instruct the switch to direct the transmitted message to the second port when the first transmission route is non-operational and when the second transmission route is operational.

5. The adapter of claim 1, further comprising:
a first output buffer configured to convey the first received message from the switch to the switching module.

6. The adapter of claim 5, further comprising:
a second output buffer configured to convey the second received message from the switch to the switching module.

7. The adapter of claim 6, wherein the second output buffer is configured to bind to a same data attribute as the first output buffer.

8. The adapter of claim 4, further comprising:
an input buffer configured to convey the transmitted message to the switch.

9. The adapter of claim 1, wherein the adapter is part of an industrial automation system.

10. A method comprising:
receiving, by an adapter, a first received message at a first port over a first transmission route, the first port having a first Internet Protocol (IP) address, wherein the first received message contains output data and wherein the first transmission route is external to the adapter;
receiving, by the adapter, a second received message at a second port over a second transmission route, the second port having a second IP address, wherein the first and second received are part of a same multicast group, and wherein the second transmission route is external to the adapter and is different from the first transmission route;
determining whether the first transmission route and the second transmission route are operational;
directing the output data contained in the first received message to the data structure when the first transmission route is operational;
directing the output data contained in the second received message to the data structure when the first transmission route is non-operational and when the second transmission route is operational; and
swapping the first and second IP addresses of the first and second ports when it is determined that the first transmission route is non-operational,
wherein determining whether the first transmission route and the second transmission route are operational comprises determining whether the first transmission route and the second transmission route are operational based on a comparison of a message delay of the first and second transmission routes.

11. The method of claim 10, further comprising:
formatting a transmitted message from input data;
directing the transmitted message to the first port when the first transmission route is operational; and
directing the transmitted message to the second port when the first transmission route is non-operational and when the second transmission route is operational.

12. The method of claim 10, further comprising:
subscribing to a multicast address of the multicast group assigned during a connection establishment phase.

13. An adapter comprising:
a first port configured to send and receive signals over a first transmission route, wherein the first transmission route is external to the adapter, and wherein the first port has a first Internet Protocol (IP) address;
a second port configured to send and receive signals over a second transmission route, the signals received by the first and second ports being part of a same multicast group, wherein the second transmission route is external to the adapter and is different from the first transmission route, and wherein the second port has a second IP address;
a memory;
a switching module connected to the first and second ports and the memory; and
a connection manager configured to monitor the signals received over the first and second transmission routes and to control a state of the switching module to cause the switching module to provide a connection between the memory and either the first transmission route or the second transmission route,
wherein the adapter is configured to swap the first and second IP addresses of the first and second ports when the first transmission route is non-operational, and
wherein the connection manager is configured to determine whether the first transmission route is operational based on a comparison of a message delay of the first and second transmission routes.

14. The adapter of claim 13, wherein the adapter is part of an industrial automation system.

15. A system comprising:
a network controller configured to send a multicast packet; and
a target input/output device having a first port and a second port, the first port having a first Internet Protocol (IP) address and the second port having a second IP address;
a network facility supporting first and second transmission routes and configured to obtain the multicast packet and, based on the multicast packet, to forward a first multicast message to the first port and a second multicast message to the second port, wherein the first multicast message and the second multicast message separately contain identical output data and wherein the first and second transmission routes are external to the network facility and are different; and
wherein the target input/output device is configured to swap the first and second IP addresses of the first and second ports when the first transmission route is non-operational, the target input/output device further comprising:
a switching module coupled to the first port and the second port and configured to obtain the identical output data contained in the first and second multicast messages;
a memory containing a data structure; and
a connection manager configured to:
determine whether the first transmission route and the second transmission route are operational;
instruct the switching module to direct the identical output data of the first multicast message to the data structure when the first transmission route is operational; and
instruct the switching module to direct the identical output data of the second multicast message to the data structure when the first transmission route is non-operational and when the second transmission route is operational,
wherein the connection manager is configured to determine whether the first transmission route and the second transmission route are operational based on a comparison of a message delay of the first and second transmission routes.

16. The system of claim 15, wherein the target input/output device further comprises:
a switch;
the target input/output device configured to:
format a device message from input data;
instruct the switch to direct the device message to the first port when the first transmission route is operational; and
instruct the switch to direct the device message to the second port when the first transmission route is non-operational and when the second transmission route is operational.

17. The system of claim 15, wherein the network facility comprises:
a managed switch configured to generate the first multicast messages and the second multicast message in response to obtaining the multicast packet.

18. The system of claim 15, wherein the system is part of an industrial automation system.

19. The system of claim 15, comprising:
another I/O device configured to pass a received multicast message to the target I/O device.

20. The adapter of claim 1, wherein the first and second received messages comprise at least one identical data packet in common.

21. The method of claim 10, wherein the first and second received messages comprise at least one identical data packet in common.

22. The adapter of claim 13, wherein the signals received by the first port comprises at least one identical data packet in common with the signals received by the second port.

23. The system of claim 15, wherein the first and second multicast packets are part of a same multicast group.

24. The adapter of claim 1, wherein the adapter is further configured to transmit messages to at least one of the first and second transmission routes from at least one of the first and second ports.

25. The method of claim 10, further comprising transmitting, by the adapter, messages to at least one of the first and second transmission routes from at least one of the first and second ports.

26. The adapter of claim 13, wherein the adapter is further configured to transmit messages to at least one of the first and second transmission routes from at least one of the first and second ports.

27. The system of claim 15, wherein the target input/output device is further configured to transmit messages to at least one of the first and second transmission routes from at least one of the first and second ports.

* * * * *